(12) United States Patent
Raynel

(10) Patent No.: US 11,254,592 B2
(45) Date of Patent: Feb. 22, 2022

(54) PROCESSES AND SYSTEMS FOR TREATING SOUR WATER TO REMOVE SULFIDE COMPOUNDS

(71) Applicant: Saudi Arabian Oil Company, Dhahran (SA)

(72) Inventor: Guillaume Robert Jean-Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 64 days.

(21) Appl. No.: 16/741,853

(22) Filed: Jan. 14, 2020

(65) Prior Publication Data
US 2021/0214246 A1 Jul. 15, 2021

(51) Int. Cl.
| | | |
|---|---|---|
| *B01D 61/02* | (2006.01) | |
| *C02F 1/44* | (2006.01) | |
| *C02F 1/467* | (2006.01) | |
| *C02F 101/10* | (2006.01) | |
| *C02F 101/18* | (2006.01) | |

(Continued)

(52) U.S. Cl.
CPC .......... *C02F 1/4672* (2013.01); *B01D 61/022* (2013.01); *B01D 61/025* (2013.01); *B01D 61/027* (2013.01); *B01D 61/08* (2013.01); *C02F 1/441* (2013.01); *C02F 1/442* (2013.01); *C02F 1/4676* (2013.01); *C02F 1/46104* (2013.01); *B01D 2311/2684* (2013.01); *B01D 2317/022* (2013.01); *C02F 2101/101* (2013.01); *C02F 2101/18* (2013.01); *C02F 2101/345* (2013.01);

(Continued)

(58) Field of Classification Search
CPC .......... B01D 61/027; B01D 2311/2684; C02F 1/442; C02F 1/4672; C02F 1/4676; C02F 2101/101; C02F 2103/10
See application file for complete search history.

(56) References Cited

U.S. PATENT DOCUMENTS

| | | | |
|---|---|---|---|
| 2,383,674 A | 8/1945 | Osborne | |
| 3,806,435 A * | 4/1974 | Ohta | ................. C02F 1/463 588/303 |

(Continued)

FOREIGN PATENT DOCUMENTS

| | | |
|---|---|---|
| CA | 2953591 A1 | 7/2018 |
| CN | 106517606 A * | 3/2017 |

(Continued)

OTHER PUBLICATIONS

Fu Xiaojing—CN-106517606-A machine translation—Mar. 2017 (Year: 2017).*

(Continued)

*Primary Examiner* — Bradley R Spies
(74) *Attorney, Agent, or Firm* — Dinsmore & Shohl, LLP

(57) ABSTRACT

A process for treating sour water includes combining the sour water with an alkali or alkaline metal hydroxide to produce a sour water mixture, the sour water comprising sulfides, passing an electric current through the sour water mixture, where passing the electric current through the sour water mixture causes at least a portion of the sulfides to react to produce a treated sour water comprising sulfates and having a pH of 7.1 to 9.8, saturating the at least a portion of the sulfates in an aqueous sulfate solution, and separating at least a portion of saturated sulfates from a saturated aqueous sulfate solution.

19 Claims, 2 Drawing Sheets

(51) Int. Cl.
*C02F 101/34* (2006.01)
*C02F 103/10* (2006.01)
*B01D 61/08* (2006.01)
*C02F 1/461* (2006.01)

(52) U.S. Cl.
CPC ...... *C02F 2103/10* (2013.01); *C02F 2301/08* (2013.01)

(56) References Cited

U.S. PATENT DOCUMENTS

| | | | |
|---|---|---|---|
| 4,526,662 A * | 7/1985 | Byerley | C02F 1/4672 205/351 |
| 5,246,597 A | 9/1993 | Jenson et al. | |
| 2007/0183953 A1* | 8/2007 | Kerley | C01B 17/32 423/244.07 |
| 2012/0168352 A1 | 7/2012 | Cillessen et al. | |
| 2013/0213892 A1* | 8/2013 | Henthorne | B01D 61/025 210/650 |
| 2014/0048485 A1* | 2/2014 | Jacobs | C02F 9/00 210/638 |
| 2014/0246382 A1 | 9/2014 | Matza et al. | |
| 2016/0355414 A1 | 12/2016 | Janson et al. | |
| 2017/0081227 A1* | 3/2017 | Riffe | C02F 9/00 |
| 2017/0349467 A1* | 12/2017 | Blohm | B01D 61/022 |
| 2018/0230026 A1 | 8/2018 | Raynel et al. | |
| 2018/0305604 A1 | 10/2018 | Breedlove et al. | |

FOREIGN PATENT DOCUMENTS

| | | |
|---|---|---|
| CN | 108178363 A | 6/2018 |
| DE | 102013010217 A1 | 12/2014 |
| GB | 1374010 A | 11/1974 |
| WO | 2017106007 A1 | 6/2017 |

OTHER PUBLICATIONS

Bartholomew, Timothy V., et al. "Osmotically assisted reverse osmosis for high salinity brine treatment." Desalination 421 (2017): 3-11. (Year: 2017).*

Weiland, R. H., N. A. Hatcher, and C. E. Jones. "HCN distribution in sour water systems." Digital Refining (2014). (Year: 2014).*

Hatcher, N.A. "Sour water stripping Part 2: phenolic water." Digital Refining (2014) (Year: 2014).*

Curcio, Efrem, et al. "Hybrid nanofiltration-membrane crystallization system for the treatment of sulfate wastes." Journal of Membrane Science 360.1-2 (2010): 493-498. (Year: 2010).*

Waterston, Katie, Dorin Bejan, and Nigel J. Bunce. "Electrochemical oxidation of sulfide ion at a boron-doped diamond anode." Journal of applied electrochemistry 37.3 (2007): 367-373. (Year: 2007).*

International Search Report and Written Opinion dated Mar. 5, 2021 pertaining to International application No. PCT/US2020/057664 filed Oct. 28, 2020, 14 pgs.

* cited by examiner

PROCESSES AND SYSTEMS FOR TREATING SOUR WATER TO REMOVE SULFIDE COMPOUNDS

TECHNICAL FIELD

Embodiments of the present disclosure generally relate to processes and systems for treating sour water, in particular, systems and processes for treating sour water to remove sulfides and other contaminants.

BACKGROUND

Various hydrocarbon drilling, production, or refining operations can produce various aqueous streams, such as sour water for example, that can include dissolved compounds, such as hydrogen sulfide, ammonium hydrosulfide, phenolic compounds, hydrogen cyanide, or combinations of these, that may be toxic, hazardous, or both. Many of these dissolved contaminant compounds must be removed from the aqueous streams before the aqueous streams can be reused in hydrocarbon drilling, production, or refining processes or directed to downstream treatment processes. Various water treatment systems are available for removing these dissolved contaminant compounds from aqueous streams that are produced from hydrocarbon drilling, production, or refining operations. However, conventional treatment systems may not be suitable for use in hydrocarbon drilling and processing environments.

SUMMARY

During hydrocarbon drilling, production, or processing operations, various aqueous streams comprising sulfur in the form of sulfides may be produced and may be referred to in the present disclosure as sour water. For example, sour water may be produced from hydrocarbon processing, such as aqueous streams from atmospheric and vacuum crude columns, fluid catalytic cracking, catalytic reforming, coker and acid gas removal units, or other unit operations at refineries or gas plants. The sour water may also include produced water from hydrocarbon production. The sour water may contain dissolved toxic compounds, such as hydrogen sulfide, ammonium hydrosulfide, phenolic compounds, hydrogen cyanide, or combinations thereof, and these toxic compounds generally must be removed from the sour water to meet the industry standards for water reuse. For example, the toxic compounds must be removed from the sour water before it can be reinjected back into the subterranean formation or otherwise reused.

Conventional sour water strippers may be used to treat the sour water at gas plants or refineries. Conventional sour water stripping processes may remove hydrogen sulfide through steam stripping and may recover ammonia in a more complex and expensive process. For example, significant amounts of energy and cooling waters may be required to produce the steam necessary to strip the hydrogen sulfide from the sour water. Once the hydrogen sulfide is stripped from the sour water, the hydrogen sulfide must then be removed from the vapor phase passed out of the sour water stripper due to the corrosive and hazardous nature of hydrogen sulfide. Further, these sour water stripper processes may not solve the issue of removing highly toxic and more challenging contaminants, such as ammonium hydrosulfide, phenolic compounds, hydrogen cyanide, or combinations of these.

Therefore, ongoing needs exist for treatment processes that are safer to operate in hydrocarbon processing facilities and require lesser quantities of treatment chemicals. Additionally, ongoing needs exist for treatment processes that are able to reduce the concentrations of sulfides and other toxic contaminants, such as phenolic compounds, hydrogen cyanide, or both, in the treated water. The processes and systems for treating the sour water of the present disclosure include electrolyzing the sour water at a pH of from 7.1 to 9.8, which may cause at least a portion of the sulfides in the sour water to react to form metal sulfates. Additionally, carbon containing constituents, such as phenol and hydrogen cyanide, may react to form metal bicarbonates. The bicarbonates may be separated from the treated sour water to produce a bicarbonate effluent and a sulfate solution. The sulfate solution may then be saturated to recover the sulfates and produce a treated water stream. The systems and processes of the present disclosure may be safer to operate in hydrocarbon processing facilities and may not require the addition of large quantities of chemicals to the sour water during treatment. The presently-described processes and systems may not require an oxidant to transform toxic compounds into other less-toxic compounds. Therefore, the processes and systems for treating the sour water may enable efficient and cost effective recovery of water from the sour water and remove sulfides and carbon-containing compounds from the sour water.

According to one aspect of the present disclosure, a system for treating sour water may include an electrolyzer operable to react at least a portion of sulfides and at least one carbon-containing compound to produce a treated sour water comprising sulfates and bicarbonates and having a pH of 7.1 to 9.8. The system may further include a separation system downstream of the electrolyzer. The separation system may be operable to separate at least a portion of the bicarbonates from the treated sour water to produce an aqueous sulfate solution. The system may further include a saturation system that may be operable to saturate the aqueous sulfate solution and to crystalize at least a portion of the sulfates in the aqueous sulfate solution.

According to another aspect of the present disclosure, a process for treating sour water may include combining the sour water with an alkali or alkaline metal hydroxide to produce a sour water mixture. The sour water may include sulfides. The process may further include passing an electric current through the sour water mixture, where passing the electric current through the sour water mixture may cause at least a portion of the sulfides to react to produce a treated sour water comprising sulfates and having a pH of 7.1 to 9.8. The process may further include saturating the at least a portion of the sulfates in an aqueous sulfate solution and separating at least a portion of saturated sulfates from a saturated aqueous sulfate solution.

Additional features and advantages of the described embodiments will be set forth in the detailed description, which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
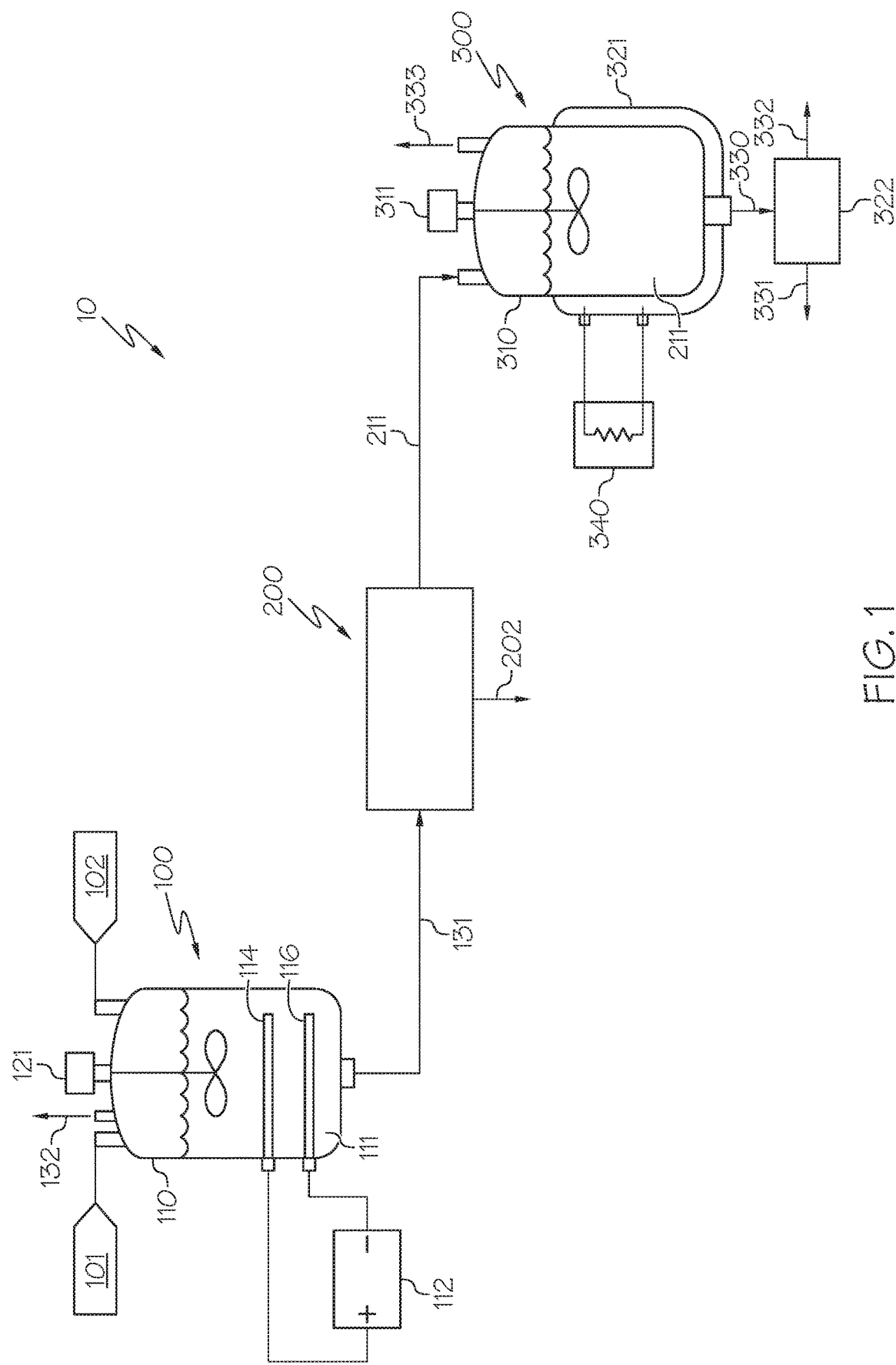
FIG. 1 is a generalized schematic diagram of an embodiment of a system for treating sour water, according to one or more embodiments described in this disclosure.
Figure 2:
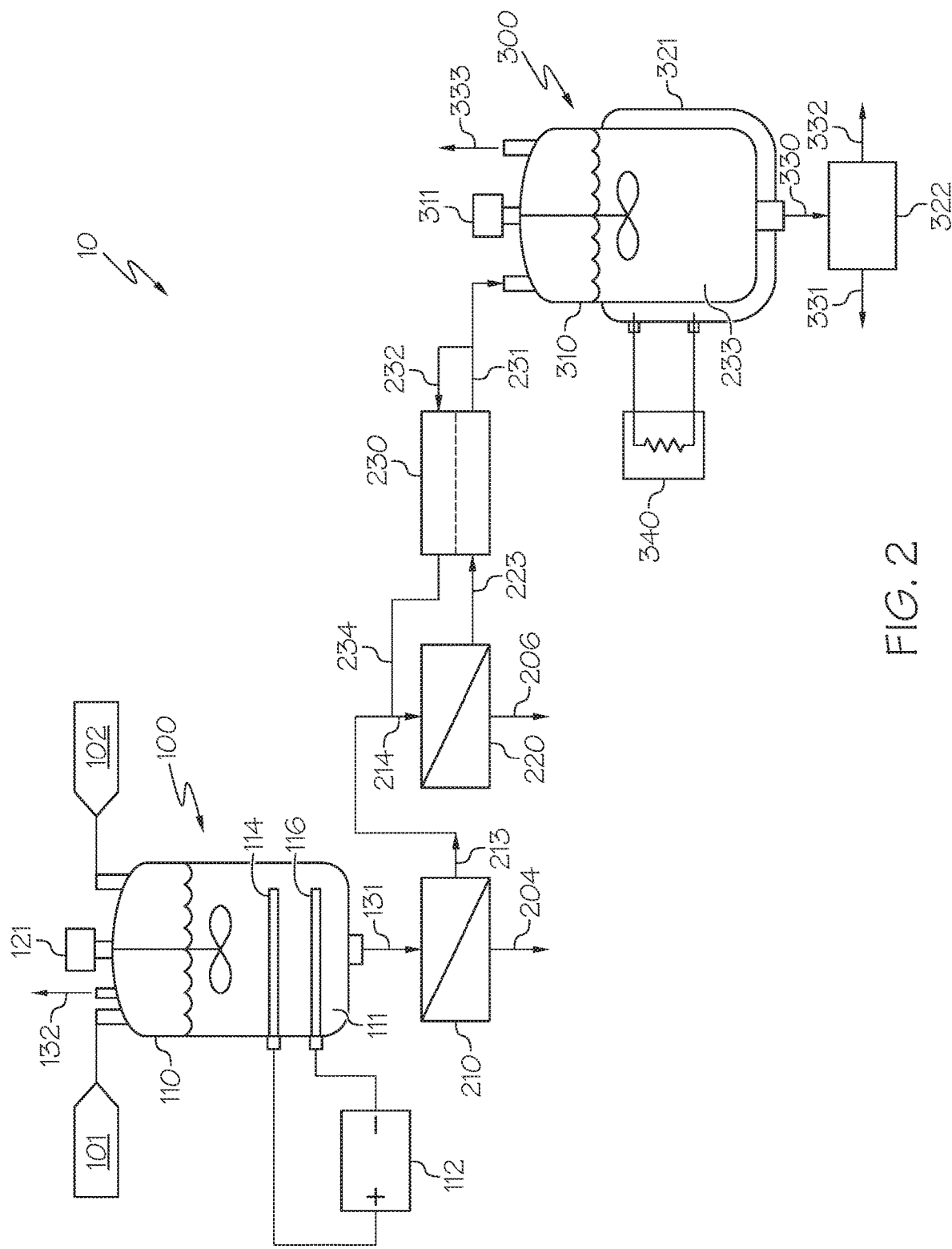
FIG. 2 depicts a schematic diagram of another embodiment of a system for treating sour water, according to one or more embodiments described in this disclosure.

For the purpose of describing the simplified schematic illustrations and descriptions of FIGS. 1-2, the numerous valves, temperature sensors, electronic controllers, and the like that may be employed and well known to those of ordinary skill in the art of certain chemical processing operations are not included. Further, accompanying components that are often included in typical chemical processing operations, gas supply systems, electrical system, pumps, compressors, agitation systems, mixers, or other subsystems may not be depicted. It should be understood that these components are within the spirit and scope of the present embodiments disclosed. However, operational components, such as those described in the present disclosure, may be added to the embodiments described in this disclosure.

Arrows in the drawings refer to process streams. However, the arrows may equivalently refer to transfer lines, which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows which do not connect two or more system components may signify a product stream which exits the depicted system or a system inlet stream which enters the depicted system. Product streams may be further processed in accompanying chemical processing systems or may be commercialized as end products.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-2. Mixing or combining may also include mixing by directly introducing both streams into a like system component, such as a vessel, reactor, separator, or other system component. For example, it should be understood that when two streams are depicted as being combined directly prior to entering a system component, the streams could equivalently be introduced into the system component and be mixed in the system component.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Processes and systems are disclosed for treating sour water to remove sulfides and carbon-containing contaminants. The sour water may include sour water streams produced from hydrocarbon processing operations, produced water from hydrocarbon drilling and production operations, or both. Referring to FIG. 1, one embodiment of a system for treating the sour water is depicted, and will be referred to throughout the present disclosure with reference number 10. The system 10 may include an electrolyzer 100, a separation system 200 downstream of the electrolyzer 100, and a saturation system 300 downstream of the separation system 200. The electrolyzer 100 may be operable to pass an electric current through the sour water 101 under basic pH conditions, which may cause at least a portion of the sulfides to react to produce a treated sour water 131 comprising sulfates, such as metal sulfates, ammonium sulfate, or both. Passing the electric current through the sour water 101 in the electrolyzer 100 may also cause at least a portion of carbon-containing constituents of the sour water 101 to react to form bicarbonates. The treated sour water 131 produced in the electrolyzer 110 may include sulfates, bicarbonates, or both. The treated sour water 131 may have a pH of 7.1 to 9.8. The separation system 200 may be operable to separate at least a portion of the bicarbonates from the treated sour water 131 to produce at least a bicarbonate effluent 202 and an aqueous sulfate solution 211. The saturation system 300 may be operable to saturate the aqueous sulfate solution 211. The saturation of the aqueous sulfate solution 211 may result in crystallization, precipitation, or both of at least a portion of the sulfates in the aqueous sulfate solution 211.

The process for treating the sour water 101 may be conducted using the system 10 for treating the sour water 101 to remove sulfides. The process for treating the sour water 101 may include combining the sour water 101 with an alkali or alkaline metal hydroxide 102 to produce a sour water mixture 111, the sour water 101 comprising sulfides. The process may further include passing an electric current through the sour water mixture 111, where passing the electric current through the sour water mixture 111 may cause at least a portion of the sulfides to react to produce the treated sour water 131 comprising sulfates. The process may further include saturating the at least a portion of the sulfates in the aqueous sulfate solution 211 and separating at least a portion of saturated sulfates from a saturated aqueous sulfate solution 330.

Systems and processes for treating the sour water of the present disclosure may remove toxic compounds, such as hydrogen sulfide, ammonium hydrosulfide, phenolic compounds, hydrogen cyanide, or combinations thereof, from the aqueous composition. The systems and processes for treating the sour water of the present disclosure may remove these hazardous compounds by breaking them down into smaller more environmentally friendly compounds, such as sulfate ions, bicarbonate ions, nitrogen, hydrogen, water, or combinations of these. The systems and processes of the present disclosure may remove sulfides, carbon-containing compounds, or both, from the sour water, which may have an initially high concentration of sulfides, at least one carbon-containing compound, or both. The processes for treating the sour water may be safer to operate in hydrocarbon processing facilities, which may be classified as explosive environments, and may require addition of lesser quantities of treatment chemicals, such as oxidizing agents, compared to conventional treatment processes. These and other advantages and benefits of systems and processes will be subsequently discussed in this disclosure.

As used in this disclosure, the term "sour water" may refer to an aqueous composition or stream containing sulfides in concentrations greater than 100 parts per million by weight (ppmw) (0.01 weight percent (wt. %)).

As used in this disclosure, the term "phenolic compound" may refer to compounds comprising at least one aromatic hydrocarbon group containing at least one hydroxyl group bonded directly to the aromatic hydrocarbon group.

As used in this disclosure, the term "produced water" may refer to water that is extracted from a subterranean formation by a production well during petroleum or natural gas production, water streams generated from a gas and oil separation plant (GOSP) or other petroleum processing facility, or combinations of these. Subterranean oil and gas reserves may often include substantial amounts of water along with the oil and gas. During gas and oil extraction, this water is also extracted as a byproduct along with the gas or oil and is subsequently separated from the gas or oil. This water separated from the gas and oil may be referred to as produced water. However, produced water may also include water naturally occurring in the subterranean formation, water injected into the subterranean formation to force oil and gas in the subterranean formation towards the production well, other water extracted from the subterranean formation, or combinations of these.

As used in this disclosure, the term "alkali metal hydroxide" may refer to the hydroxide salt of a metal in Group 1 of the International Union of Pure and Applied Chemistry periodic table of the elements (IUPAC periodic table), such as but not limited to sodium hydroxide, potassium hydroxide, lithium hydroxide, or combinations of these. As used in this disclosure, the term "alkaline metal hydroxide" may refer to the hydroxide salt of a metal in Group 2 of the IUPAC periodic table (alkaline earth metals), such as but not limited to magnesium hydroxide, calcium hydroxide, or combinations of these.

As used in this disclosure, a "separation system" may refer to any separation device or system of separation devices that at least partially separates one or more chemicals that are mixed in a process stream from one another. For example, a separation system may selectively separate differing chemical species from one another, forming one or more chemical fractions. Examples of separation systems include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation system and be divided, or separated, into two or more process streams of desired composition.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

The systems and processes for treating the sour water are described in this disclosure in the context of treating sour water generated from hydrocarbon production and processing operations. However, it is understood that the systems and processes for treating the sour water may be used for other aqueous compositions that include sulfides. In some embodiments, the sour water may include one or more aqueous streams produced during processing of hydrocarbons. The hydrocarbons may be crude oil, vacuum residue, tar sands, bitumen, atmospheric residue, vacuum gas oils, demetalized oils, naphtha streams, natural gas, other hydrocarbon streams, or combinations of these materials, and treatment of these hydrocarbons may result in transferring sulfur compounds, such as sulfides, to the aqueous phase.

Referring to FIG. 1, an embodiment of the system 10 for treating the sour water 101 is depicted. The system 10 for treating the sour water 101 may include an electrolyzer 100, a separation system 200 downstream of the electrolyzer 100, and a saturation system 300 downstream of the separation system 200. The system 10 for treating sour water 101 may receive a sour water 101 from one or more sources of sour water and directly process the sour water 101 to produce treated water. The system 10 may also be operable to produce one or more system product streams.

The electrolyzer 100 may be positioned upstream of the separation system 200. The electrolyzer 100 may include a vessel, such as an electrolyzing vessel 110, and a plurality of electrodes 114, 116 disposed within the electrolyzing vessel 110. The sour water 101 may be introduced to the electrolyzing vessel 110. The sour water 101 may include sulfides, such as but not limited to hydrogen sulfide, ammonium hydrosulfide, or both. The sour water 101 may also include at least one carbon-containing compound, such as phenol, hydrogen cyanide, or other carbon-containing compounds. The sour water 101 may include one or more sour water streams from hydrocarbon processing operations. For example, the sour water 122 may be an aqueous stream recovered from an atmospheric or vacuum crude column. The sour water 101 may additionally include produced water or water streams from petroleum operations such as the GOSP and petroleum processing facilities. The sour water 101 may also include other aqueous streams, such as fresh water used for crude oil desalting, industrial wastewater generated at another petroleum processing facility, water from firefighting water storage, other water stream, or combinations of these.

The sulfides in the sour water 101 may comprise at least one of hydrogen sulfide, ammonium hydrosulfide, or both. For example, the sour water 101 may comprise from 100 ppmw to 100,000 ppmw hydrogen sulfide based on the total mass flow rate of the sour water 101. For example, the sour water 101 may comprise from 100 ppmw to 95,000 ppmw, from 100 ppmw to 90,000 ppmw, from 150 ppmw to 100,000 ppmw, or from 150 ppmw to 95,000 ppmw hydrogen sulfide based on the total mass flow rate of the sour water 101. The sour water 101 may comprise from 100 ppmw to 100,000 ppmw ammonium hydrosulfide based on the total mass flow rate of the sour water 101. For example, the sour water 101 may comprise from 100 ppmw to 95,000 ppmw, from 100 ppmw to 90,000 ppmw, from 150 ppmw to 100,000 ppmw, or from 150 ppmw to 95,000 ppmw ammonium hydrosulfide based on the total mass flow rate of the sour water 101.

The sour water 101 may further include at least one carbon-containing compound. The at least one carbon-containing compound may include one or more phenolic compounds, hydrogen cyanide, or both. Other carbon-containing compounds may also be present in the sour water 101. The sour water 101 may include from 50 ppmw to 500 ppmw phenolic compounds based on the total mas flow rate of the sour water 101. For example, the sour water may include from 50 ppmw to 450 ppmw, from 50 ppmw to 400 ppmw, from 45 ppmw to 500 ppmw, from 45 ppmw to 450 ppmw, from 40 ppmw to 500 ppmw, or from 40 ppmw to 450 ppmw phenolic compounds based on the total mass flow rate of the sour water 101. Alternatively or additionally, the sour water 101 may include from 300 ppmw to 500 ppmw hydrogen cyanide based on the total mass flow rate of the sour water 101. For example, the sour water 101 may include from 300 ppmw to 450 ppmw, from 300 ppmw to 400 ppmw, from 350 ppmw to 500 ppmw, from 350 ppmw to 450 ppmw, or from 400 ppmw to 500 ppmw hydrogen cyanide based on the total mass flow rate of sour water 101. In some embodiments, the sour water 101 may be substantially free of chloride ions, such as chloride ions from hydrogen chloride and/or metal chloride. As used in the present disclosure, the term "substantially free" of a constituent may refer to a composition having less than 0.1 weight percent (wt. %) of that constituent based on the total weight of the composition. As a non-limiting example, the sour water 101 that is substantially free of chloride ions may include less than 0.1 wt. % chloride ions based on the total weight of the sour water 101. In some embodiments, the sour water 101 may include some metal chlorides, such as sodium chloride that may be entrained in nebulized water droplets from atmospheric/vacuum distillation that may be included in the sour water 101.

The alkali or alkaline metal hydroxide 102 may also be introduced to the electrolyzing vessel 110. The sour water 101 may be combined with the alkali or alkaline metal hydroxide 102 to produce a sour water mixture 111. As previously discussed, the alkali or alkaline metal hydroxide 102 may be a metal hydroxide in which the metal is selected from a metal in Groups 1 or 2 of the IUPAC periodic table. The alkali or alkaline metal hydroxide 102 may include but is not limited to, sodium hydroxide, potassium hydroxide, magnesium hydroxide, calcium hydroxide, or combinations of these. The alkali or alkaline metal hydroxide 102 may be combined with the sour water 101 in the electrolyzing vessel 110 or upstream of the electrolyzing vessel 110. The amount of alkali or alkaline metal hydroxide 102 combined with the sour water 101 may be sufficient to maintain the pH of the sour water mixture 111 in a range of from 7.1 to 9.8. The ratio of alkali or alkaline metal hydroxide 102 to sour water 101 in the sour water mixture 111 may depend on the composition of the sour water 101.

As previously discussed, the sour water mixture 111 may be maintained at a pH in a range of from 7.1 to 9.8, such as from 7.1 to 9.4, from 7.1 to 9.1, from 7.1 to 8.3, from 7.5 to 9.8, from 7.5 to 9.4, from 7.5 to 9.1, or even from 7.5 to 8.3. In the pH range of from 7.1 to 9.8, at least 80 wt. % of the carbon may be present in the form of bicarbonates. Within a pH range of from 7.5 to 9.4, at least 90 wt. % of the carbon may be present in the form of bicarbonates in the pH range from 7.5 to 9.4.

Referring again to FIG. 1, in the electrolyzing vessel 110, the sour water mixture 111 may be contacted with the electrodes, such as anode 114 and cathode 116. Although depicted in FIG. 1 as having a single anode 114 and a single cathode 116, it is understood that the electrolyzer 100 may include a plurality of anodes 114, such as 2, 3, 4, 5, 6, or more than 6 anodes 114, and a plurality of cathodes 116, such as 2, 3, 4, 5, 6, or more than 6 cathodes 116. The multiple anodes 114 and multiple cathodes 116 may be distributed throughout the electrolyzing vessel 110. In some embodiments, the electrolyzing vessel 110 may include from 2 to 20 electrodes 114, 116. The electrolyzer 100 may further include an electric power source 112, which may be electrically coupled to each of the electrodes, such as anode 114 and cathode 116. The electric power source 112 may be operable to produce an electric potential between the cathodes 116 and the anodes 114, causing an electric current to pass through the sour water mixture 111 in the electrolyzing vessel 110. The electric power source 112 may be capable of producing voltage and current sufficient to convert sulfides in the sour water 101 to sulfates. The electric power source 112 may also be capable of producing voltage and current sufficient to convert at least a portion of the carbon-containing compounds in the sour water 101 to bicarbonate compounds. In some embodiments, the electric power source 112 may be a direct current (DC) power source 112. In some embodiments, positioning the electrodes 114, 116 in the bottom portion, the middle portion, or both of the electrolyzing vessel 110 may enable the gases produced in the electrolyzer 100 to contribute to mixing of the sour water mixture 111. The electric potential (voltage) may be greater than or equal to 1 volt (V). For example, the voltage may be from 1 V to 5 V, from 1 V to 4.5 V, from 1 V to 4 V, from 1 V to 3.5 V, from 1 V to 3.0 V, from 1.5 V to 5 V, from 1.5 V to 4.5 V, from 1.5 V to 4 V, from 1.5 V to 3.5 V, from 1.5 V to 3 V, from 2 V to 5 V, from 2 V to 4.5 V, from 2 V to 4 V, from 2 V to 3.5 V, or from 2 V to 3 V. In some embodiments, the current density may be greater than or equal to 0.1 ampere per square centimeter ($A/cm^2$). For example, the current density may be from 0.1 $A/cm^2$ to 1 $A/cm^2$, from 0.1 $A/cm^2$ to 0.95 $A/cm^2$, from 0.1 $A/cm^2$ to 0.9 $A/cm^2$, from 0.15 $A/cm^2$ to 0.95 $A/cm^2$, or from 0.15 $A/cm^2$ to 0.9 $A/cm^2$ Referring again to FIG. 1, in some embodiments, the electrolyzer 100 may include an agitation system 121 for mixing the sour water mixture 111 during the electrolyzing process. The agitation system 121 may include, but is not limited to, one or more agitators, mixers, bubblers, aerators, baffles, other devices capable of mixing the contents of the electrolyzing vessel 110, or combinations of these. In some embodiments, hydrogen gas, nitrogen gas, or both, formed at the electrodes may contribute to mixing of the sour water mixture 111.

The electric current may cause electrolysis of the sour water mixture 111 to produce the treated sour water 131. The electric current may cause at least a portion of the sulfides in the sour water 101 to react to form sulfates, such as metal sulfates, ammonium sulfate, or both, in the treated sour water 131 at pH of from 7.1 to 9.8. The electric current may cause carbon-containing compounds in the sour water 101 to react to form bicarbonates in the treated sour water 131 at pH of from 7.1 to 9.8. The bicarbonates may also be soluble in the treated sour water 131 in the pH range of 7.1 to 9.8. The electrolyzing process may be initiated by passing the electric current through the sour water mixture 111 in the electrolyzer 100. Reaction 1 (RXN 1) to Reaction 5 (RXN 5), provided subsequently in this disclosure, illustrate the oxidation/reduction and acido-basic reactions that occur during electrolyzing the sour water mixture 111. As will be discussed subsequently in this disclosure, the electrolyzing process may convert sulfides into sulfate ions (sulfates). The electrolyzing process may also convert carbon-containing compounds into bicarbonate ions (bicarbonates). The electrolyzing process conducted in the electrolyzer 100 may additionally produce hydrogen gas, nitrogen gas, or both.

The hydrogen gas, nitrogen gas, or both may be passed out of the electrolyzing vessel 110 as gas stream 132. The acido-basic reaction may take place between hydrogen cyanide and hydroxide ions to produce cyanide ions, as shown in RXN 1.

$$HCN+OH^- \leftrightarrows CN^- + H_2O \quad \text{RXN 1}$$

$$3H_2O + SH^- + OH^- \leftrightarrows SO_4^{2-} + 4H_2 \quad \text{RXN 2}$$

$$11H_2O + C_6H_6O \leftrightarrows 6CO_2 + 14H_2 \quad \text{RXN 3}$$

$$6H_2O + 2CN^- \leftrightarrows 2CO_2 + 2OH^- + N_2 + 5H_2 \quad \text{RXN 4}$$

$$CO_2 + OH^- \leftrightarrows HCO_3^- \quad \text{RXN 5}$$

As shown in Reaction 2 (RXN2) to Reaction 4 (RXN 4), the series of oxido-reduction reactions may occur to produce sulfate ions, hydroxide ions, nitrogen, hydrogen, and carbon dioxide. As shown in RXN 5, carbon dioxide may react with hydroxide ions to produce bicarbonate ions. The bicarbonate ions may form salts with the alkali or alkaline metals from the alkali or alkaline metal hydroxide 102. The bicarbonate salts may be separated from the treated sour water 131 downstream of the electrolyzer 100. Hydroxide ions, such as hydroxide ions produced through RXN 4 and hydroxide ions added by way of the metal hydroxides 102 introduced to the electrolyzer 100, may maintain the pH of the electrolyzer 100 from 7.1 to 9.8. The treated sour water 131 may have a pH from 7.1 to 9.8 when passed out of the electrolyzer 100. As shown in RXN 1 to RXN 5, the reactions to produce bicarbonates may occur in basic conditions. In contrast, as shown in Reaction 6 (RXN6) and Reaction 7 (RXN7), the oxidation of sulfides, such as hydrogen sulfides, to sulfuric acid may occur in acidic conditions, such as at pH less than 7. (See reaction below). The energy consumption, for example, voltage for the electrolysis, for RXN 6 and RXN 7 in acidic conditions is the same as in basic conditions.

$$8H_2S + 32H_2O \leftrightarrows 8SO_4H^- + 8H^+ + 32H_2 \quad \text{RXN 6}$$

$$8NH_4SH + 32H_2O \leftrightarrows 8SO_4H^- + 8NH_4^+ + 32H_2 \quad \text{RXN 7}$$

As will be discussed subsequently in this disclosure, in the separating process, the bicarbonate ions may be separated from the treated sour water 131. At a pH of from 7.1 to 9.8, sulfates may be separated from the treated sour water 131, which includes the water, sulfates, and bicarbonates. Under acidic conditions having pH less than 7.1, the treated sour water 131 may include the water, sulfates, and bisulfates. The proportion of bisulfates in the total sulfates in the treated sour water 131 may increase with decreasing pH (increasing acidity). For example, at a pH of 7, no bisulfates are present in the treated sour water 131. As the pH is decreased to 5.9 and again to 1.9, the proportion of bisulfates may increase to 0.01 mol % and 50 mol %, respectively, based on the total moles of sulfates and bisulfates in the treated sour water 131. Operating the electrolyzer 100 under acidic conditions may reduce the efficiency of separating the bicarbonates from the sulfates and bisulfates through nanofiltration. At a pH of greater than 5, a typical nanofiltration membrane may exhibit a rejection rate of bisulfate and sulfate of about 97%. Reducing the pH below 5 greatly decreases the rejection rate of bisulfate and sulfate, which results in greater amounts of the bisulfates and sulfates passed through the membrane. At pH of 2.5, the nanofiltration membrane may have a reject rate of bisulfates and sulfates of 7%. Thus, under acidic conditions of pH less than 7, separation of the bicarbonates from the sulfates by nanofiltration may be more difficult compared to operation in the pH range of 7.1 to 9.8.

Operation of the electrolyzer 100 at pH greater than 9.8 may also have adverse effects on the separation efficiency of a nanofiltration process for separating bicarbonates from sulfates in the treated sour water 131. In a pH range of from 7.1 to 8.5, the typical nanofiltration membrane may have a rejection rate of bicarbonate of 30% of the total bicarbonate in the treated sour water 131. This rejection rate of bicarbonate increases with increasing pH. For example, at a pH of 9, the nanofiltration membrane may have a reject rate of bicarbonates of 40%. Thus, operation of the electrolyzer 100 at pH greater than 9.8 may greatly reduce the efficiency of separation of bicarbonates from sulfates through nanofiltration. Thus, the electrolyzer 100 may be operated at a pH of from 7.1 to 9.8.

Treatment of the sour water 101 in the electrolyzer 100 may be performed continuously, semi-continuously, or batchwise. Although shown in FIG. 1 as including a single electrolyzer 100, in some embodiments, the system 10 may include a plurality of electrolyzers 100, which may be arranged and operated in parallel or in series. The treated sour water 131 may include the sulfate ions, the bicarbonate ions, or both, produced in the electrolyzer 100. Referring again to FIG. 1, the gas stream 132 may be passed out of the electrolyzer 100. The gas stream 132 may include nitrogen gas, hydrogen gas, or both. The gas stream 132 may be passed to one or more downstream unit operations for further processing, such as but not limited to separation of the nitrogen and hydrogen into a nitrogen stream and a hydrogen stream. The hydrogen stream may be directed to one or more fuel cells to generate electrical power, which may reduce the energy consumption of the system 10. Additionally or alternatively, the hydrogen may be passed to one or more other processes as a reactant, intermediate, or fuel gas stream.

The treated sour water 131 may be passed from the electrolyzer 100 to the separation system 200. The treated sour water 131 may be passed directly from the electrolyzer 100 to the separation system 200 without passing through an intervening unit operation operable to change the composition of the treated sour water 131. The treated sour water 131 may include the sulfate ions and bicarbonate ions produced in the electrolyzer 100. The treated sour water 131 may also include excess metal hydroxide not consumed in the electrolyzer 100, the treated sour water 131 may have a pH of from 7.1 to 9.8.

Referring again to FIG. 1, the system 10 for treating the sour water 101 may include the separation system 200 downstream of the electrolyzer 100. The separation system 200 may be positioned upstream of the saturation system 300. The separation system 200 may include one or more separators for separating the bicarbonate ions from the treated sour water 131. The treated sour water 131 may be passed from the electrolyzer 100 to the separation system 200. The separation system 200 may be operable to separate at least a portion of the bicarbonate ions from the treated sour water 131 to produce a bicarbonate effluent 202 and an aqueous sulfate solution 211. The separation system 200 may include one or a plurality of nanofiltration units. The nanofiltration units may include a semi-permeable membrane capable of permitting the bicarbonate ions and a portion of the water from the treated sour water 131 to pass through while preventing passage of the sulfate ions. Thus, the bicarbonate ions and a portion of the water may pass through the semi-permeable membrane in the separation system 200 to a permeate side of the membrane, which the sulfate ions and the remainder of the water is retained on the retentate side of the membrane.

The control of pH within the range of from 7.1 to 9.8 or from 7.5 to 9.4 may enable separation of the carbon-containing compounds from the sulfate ions through nano-filtration. At pH of from 7.1 to 8.3, the bicarbonate and carbonic acid produced in the electrolyzer can pass through the nanofiltration membrane. Above a pH of 8.3, such as from 8.3 to 9.8, at least a portion of the carbonates may remain with the sulfate stream. Between 8.3 and 9.1, up to 5 wt. % of the metal carbonates from the treated sour water 131 may remain with the aqueous sulfate solution 211. Because the solubility of metal carbonates in aqueous solution is greater than the solubility of the metal sulfates, the metal carbonates passed through into the aqueous sulfate solution 211 may not impact the rest of the process. Any metal carbonates passed through into the aqueous sulfate solution 211, such as when the pH of the sour water mixture 111 in the electrolyzer 110 is greater than 8.3, may ultimately exit the system in the ammonium sulfate effluent 331.

The separation system 200 may be operable to produce the aqueous sulfate solution 211 and the bicarbonate effluent 202. The bicarbonate effluent 202 may include greater than 60 percent (%), greater than 70%, greater than or equal to 80%, or even greater than 90% by weight of the bicarbonate ions from the treated sour water 131. The bicarbonate effluent 202 may include at least a portion of the water, sulfates, metal hydroxides, or combinations of these, from the treated sour water 131. The metal bicarbonate product 202 may include less than 50%, less than 40%, less than 30%, or even less than 20% of the sulfates from the treated sour water 131 by weight. The bicarbonate effluent 202 may be passed to one or more downstream unit operations for further processing, such as recovery and purification of the metal bicarbonates, which may be used as an intermediate in various commercial applications.

The aqueous sulfate solution 211 may include the sulfates produced in the electrolyzer 100, water, and excess alkali or alkaline metal hydroxides 102. The aqueous sulfate solution 211 may include at least 90%, at least 95%, at least 98%, or even at least 99% of the sulfates from the treated sour water 131. The aqueous sulfate solution 211 may include less than 40%, less than 30%, less than 20% or even less than 10% by weight of the bicarbonate ions from the treated sour water 131. The aqueous sulfate solution 211 may be passed from the separation system 200 to the saturation system 300.

Referring to FIG. 1, in the system 10 for treating the sour water 101 depicted, the system 10 may include the saturation system 300 downstream of the separation system 200. The saturation system 300 may be fluidly coupled to the separation system 200. The aqueous sulfate solution 211 may be passed from the separation system 200 to the saturation system 300. In some embodiments, the aqueous sulfate solution 211 may be passed directly from the separation system 200 to the saturation system 300 without passing through an intervening unit operation operable to change the composition of the aqueous sulfate solution 211. The saturation system 300 may include a vessel, such as a saturating vessel 310. The aqueous sulfate solution 211 may be introduced to the saturating vessel 310. The saturation system 300 may be operable to remove water from the aqueous sulfate solution 211 to concentrate the aqueous sulfate solution 211, which may cause saturation of at least a portion of the sulfates in the aqueous sulfate solution 211 to form a saturation effluent 330. The saturation effluent 330 may include at least the solid metal sulfates in an aqueous suspension.

In some embodiments, the saturation system 300 may be suitable for performing a batch saturation process, in which the saturation system 300 may include a mixed-suspension, mixed-product-removal (MSMPR) saturators/crystallizer. In embodiments, the saturation system 300 may instead or additionally be suitable for performing a continuous saturation process, in which the saturation system 140 may include two or more MSMPR saturators/crystallizers in parallel, force circulation crystallizers, draft tube baffle crystallizers, or combinations of such crystallizers. In embodiments, the saturation system 300 may include a vacuum crystallization system. In embodiments, the saturation system 300 may be a vacuum saturation system or vacuum crystallization system that includes a plurality of semi-batch MSMPR crystallizers. The saturation system 300 may include one or a plurality of saturators or crystallizers operated in parallel or in series. The saturation system 300 may include an agitation system 311 for mixing the aqueous sulfate solution 211 during the saturating process. The agitation system 311 may include, but is not limited to, one or more agitators, mixers, bubblers, aerators, baffles, other devices capable of mixing the contents of the saturating vessel, or combinations of these. The agitation system 311 may improve heat transfer in the saturation system 300.

The saturation system 300 may further include a heat transfer system 340 and a jacket 321. The heat transfer system 340 may be operable to maintain the saturation temperature in the saturation system 300. In embodiments, the heat transfer system 340 may operate to heat the aqueous sulfate solution 211 to compensate for the latent heat of vaporization of water evaporated from the aqueous sulfate solution 211 during vacuum saturation.

The vacuum saturation system 300 may remove water from the aqueous sulfate solution 211, which may saturate at least a portion of the sulfates in the aqueous sulfate solution 211 with a decreasing solubility at decreasing temperature. For example, the pressure may be gradually reduced, whereby the solvent, such as but not limited to water, evaporates and the temperature of the aqueous sulfate solution 211 decreases. By lowering the temperature, the at least a portion of the sulfates may be saturated to produce solid metal sulfates. Saturation may cause at least a portion of the metal sulfates to precipitate or crystallize. In some embodiments, the aqueous sulfate solution 211 at the inlet of the saturation system 300 may have a temperature of from 30 degrees Celsius (° C.) to 50° C., from 30° C. to 45° C., from 30° C. to 40° C., from 35° C. to 50° C., from 35° C. to 45° C., from 35° C. to 40° C., from or 40° C. to 50° C. The aqueous sulfate solution 211 may be heated in the saturation system 300 from 50° C. to 80° C., from 50° C. to 75° C., from 50° C. to 70° C., from 50° C. to 65° C., from 50° C. to 60° C., from 55° C. to 80° C., from 55° C. to 75° C., from 55° C. to 70° C., from 55° C. to 65° C., from 60° C. to 80° C., from 60° C. to 75° C., from 60° C. to 70° C., from 65° C. to 80° C., from 65° C. to 75° C., or from 70° C. to 80° C. The aqueous sulfate solution 211 may be saturated under a vacuum of from 88 kilopascals (kPa) to 54 kPa, from 88 kPa to 61 kPa, from 88 kPa to 68 kPa, from 81 kPa to 54 kPa, from 81 kPa to 61 kPa, from 81 kPa to 68 kPa, from 75 kPa to 54 kPa, from 75 kPa to 61 kPa, or from 75 kPa to 68 kPa. The vacuum of the saturation system 300 may depend on the operating temperature of the saturation system 300. For example, at a temperature of 80° C. in the saturation system 300, the vacuum may be 54 kPa (16 inches of mercury). As the temperature decreases, the vacuum may be increased. At the temperature of 50° C. in the saturation system 300, the vacuum may be 88 kPa (26 inches of mercury).

The aqueous sulfate solution 211 may be cooled in the saturation system 300. In some embodiments, the saturation effluent 330 at the outlet of the saturation system 300 may have a temperature of from 30° C. to 50° C., from 30° C. to 45° C., from 30° C. to 40° C., from 35° C. to 50° C., from 35° C. to 45° C., from 35° C. to 40° C., or from 40° C. to 50° C.

As will be discussed subsequently in this disclosure, the saturating process to saturate at least a portion of the sulfates in the aqueous sulfate solution 211 conducted in the saturating vessel 310 may produce a water vapor stream 333 and a saturation effluent 330. Water may be evaporated from the aqueous sulfate solution 211 in the saturation system 300. The evaporated water may be passed out of the saturation system 300 as the water vapor stream 333. The water vapor stream 333 may be passed to a condenser (not shown) that is downstream from—and fluidly coupled to—the saturation system 300. The condenser may be operable to condense the water vapor in the water vapor stream 333 to produce treated water. The amount of treated water removed from the saturation system 300 in the water vapor stream 333 may be less than or equal to 80 percent by volume (vol. %) based on the total volume or volumetric flow rate of the aqueous sulfate solution 211. In some embodiments, the amount of treated water removed from the saturation system 300 in the water vapor stream 333 may be from 60 vol. % to 80 vol. %, such as from 60 vol. % to 75 vol. %, or from 60 vol. % to 70 vol. %, based on the total volume flow rate of the aqueous sulfate solution 211 passed to the saturation system 300.

Referring again to FIG. 1, the saturation effluent 330 may be passed out of the saturation system 300. The saturation effluent 330 may include the saturated solid metal sulfates. The metal of the saturated metal sulfates may include the metal from the metal hydroxide 102 introduced to the electrolyzer. The metals may include but are not limited to alkali or alkaline metals from Groups 1 and 2 of the IUPAC periodic table. The saturation effluent 330 may additionally include ammonium compounds, such as but not limited to ammonium sulfates. The ammonium sulfates may be soluble in the saturation effluent 330.

The saturation system 300 may include a filtration system 322. The filtration system 322 may be positioned downstream of the saturating vessel 310. The saturation effluent 330 may be passed from the saturating vessel 310 to the filtration system 322. The filtration system 322 may be operable to separate at least a portion of the saturated metal sulfates from the saturation effluent 330 to produce a metal sulfate product 332 and an ammonium sulfate effluent 331. In embodiments, the metal sulfate in the metal sulfate product 332 may include sodium sulfate. The metal sulfate product 332 may include from 20% to 70% of the metal sulfates from the saturation effluent 330 by weight, such as from 30% to 70%, from 40% to 70%, from 20% to 65%, from 30% to 65%, from 40% to 65%, from 20% to 60%, from 30% to 60%, or from 40% to 60% of the metal sulfates from the saturation effluent 330 by weight. The metal sulfate product 332 may be passed out of the system 10 to one or more downstream unit operations for further processing, such as resaturation, purification, or other process. The sodium sulfate may be valorized as an intermediate or filler in various industries.

The ammonium sulfate effluent 331 may include at least 90%, at least 95%, at least 98%, or even at least 99% by weight of the ammonium sulfate from the saturation effluent 330. The ammonium sulfate effluent 331 may also include at least 90%, at least 95%, or even at least 98% by weight of the water in the saturation effluent 330. The ammonium sulfate effluent 331 may include at least 30%, at least 35%, or at least 40% by weight of the metal sulfate from the saturation effluent 330. The ammonium sulfate effluent 331 may be passed out of the system 10 to one or a plurality of downstream unit operations for further processing. For example, the ammonium sulfate effluent 331 may be passed to a separation and purification system to separate the ammonium sulfate from the ammonium sulfate effluent 331 and purify the ammonium sulfate. The ammonium sulfate recovered from the process as a solid or as an aqueous solution may be useful as a fertilizer for alkaline soil, as a precursor of chloramine for water disinfection, or as an intermediate in other industrial applications.

Referring again to FIG. 1, operation of the system 10 for treating sour water 101 will be further described. In operation of the system 10, the sour water 101, which may include sulfides and carbon-containing compounds, and the alkali or alkaline metal hydroxide 102 may be introduced to the electrolyzer 100. The sour water 101 and the alkali or alkaline metal hydroxide 102 may be combined to form the sour water mixture 111 in the electrolyzer 100. The electrolyzer 100 may be operable to pass an electric current through the sour water mixture 111 to produce the treated sour water 131, which may include sulfate ions and bicarbonate ions. The treated sour water 131 may be passed out of the electrolyzer 100 to the separation system 200 downstream of the eletrolyzer 100. The separation system 200 may be operable to separate at least a portion of the bicarbonate ions from the treated sour water 131 to produce the bicarbonate effluent 202 and the aqueous sulfate solution 211. The bicarbonate effluent 202 may be passed out of the separation system 200 and out of the system 10. The aqueous sulfate solution 211 may be passed from the separation system 200 to the saturation system 300 downstream of the separation system 200. The saturation system 300 may be operable to saturate, crystallize, or both, at least a portion of the sulfates in the aqueous sulfate solution 211 to produce a saturation effluent 330. Water vapor may be removed from the saturation system 300 as water vapor stream 333, which may be condensed to form treated water. The saturation effluent 330 may be passed out of the saturation vessel 310 to a filtration unit 332. The filtration unit 332 may be operable to separate the saturation effluent 330 into the metal sulfate product 332 and the ammonium sulfate effluent 331. The ammonium sulfate effluent 331 and the metal sulfate product 332 may be passed out of the system 10 and further processed for recovery and purification of the ammonium sulfate and metal sulfates, respectively.

Referring to FIG. 2, the system 10 for treating the sour water 101 may include the electrolyzer 100, a first nanofiltration system 210, a second nanofiltration system 220, an osmotically-assisted reverse osmosis (OARO) system 230, and the saturation system 300. In other words, the separation system 200 of FIG. 1 may include the first nanofiltration system 210, the second nanofiltration system 220, and the OARO system 230 as shown in FIG. 2. While the present description and examples may specify the system 10 for treating the sour water 101 in FIG. 2 including two nanofiltration systems, it should be understood that the system 10 may include, but is not limited to, one, two, three, or more than three nanofiltration systems.

The electrolyzer 100 may be positioned upstream of the separation system 200 (FIG. 1), such as upstream of the first nanofiltration system 220. The electrolyzer 100 may have any of the features or characteristics previously described for the electrolyzer 100. The sour water 101 may be introduced to the electrolyzer 100. The alkali or alkaline metal hydroxide 102 may also be introduced to the electrolyzer 100. The sour water 101 may be combined with the alkali or alkaline metal hydroxide 102 to produce the sour water mixture 111. The electrolyzer 100 may be operable to pass an electric current through the sour water mixture 111 to react at least a portion of the sulfides in the sour water mixture 111 to produce the treated sour water 131. The treated sour water 131 may comprise sulfate ions. Treated sour water 131 may also include bicarbonate ions. The treated sour water 131 may have a pH of from 7.1 to 9.8. The treated sour water 131 may have a pH of from 7.1 to 8.5, 7.5 to 9.8, or 7.5 to 8.5. The treated sour water 131 may have a pH of 8.

Referring again to FIG. 2, the system 10 for treating the sour water 101 may include the first nanofiltration system 210 downstream of the electrolyzer 100. The first nanofiltration system 210 may be positioned upstream of the second nanofiltration system 220. The treated sour water 131 may be passed from the electrolyzer 100 to the first nanofiltration system 210. The first nanofiltration system 210 may be operable to separate the treated sour water 131 into a permeate 204 enriched in bicarbonate ions and a retentate 213. The first nanofiltration system 210 may include a semi-permeable membrane or nanofiltration membrane that may be permeable to the bicarbonate ions, but may not be permeable to the sulfate ions. Examples of nanofiltration systems may include, but are not limited to, filters such as filter presses, rotary filters or other types of filter, nanofiltration membrane, or combinations of filters. The first nanofiltration system 210 may include a di-anion selective nanofilter. The di-anion selective nanofilter may be a polymeric membrane, such as but not limited to a hollow fiber polymeric membrane or a spiral-wound polymeric membrane.

The permeate 204 may include an aqueous solution of bicarbonate ions. The permeate 204 may also include at least a portion of the metal ions, such as sodium, from the treated sour water 131. The metal ions may be any of the metal ions formed from dissociation of the alkali or alkaline metal hydroxide 102 introduced to the electrolyzer 100, as previously discussed. The permeate 204 may include at least 60%, at least 70%, at least 80%, or at least 90% by weight of the bicarbonate ions from the treated sour water 131. The permeate 204 may be passed out of the system 10 to one or more downstream unit operations for further processing, such as but limited to separation and recovery of the metal bicarbonates, such as but not limited to sodium bicarbonate. The retentate 213 may comprise an aqueous solution of sulfate ions and ammonium ions. The retentate 213 may include at least 90%, at least 95%, at least 98%, or even at least 99% by weight of the sulfate ions from the treated sour water 131. The retentate 213 may also include the ammonium sulfate from the treated sour water 131 produced in the electrolyzer 100.

Referring again to FIG. 2, the system 10 for treating the sour water 101 may include the second nanofiltration system 220 downstream of the first nanofiltration system 210. The second nanofiltration system 220 may be positioned upstream of the OARO system 230. The retentate 213 may be passed from the first nanofiltration system 210 to the second nanofiltration system 220. The second nanofiltration system 220 may be operable to dewater the retentate 213 to produce a sulfate solution 223 and a low-salinity water stream 206. The second nanofiltration system 220 may include a semi-permeable membrane or nanofiltration membrane that may be permeable to water, but may not be permeable to the sulfate ions in the retentate. The second nanofiltration system 220 may include a nanofilter. Examples of nanofiltration systems may include, but are not limited to, filters such as filter presses, rotary filters or other types of filter, nanofiltration membrane, or combinations of filters. The second nanofiltration system 220 may include a di-anion selective nanofilter. The di-anion selective nanofilter may be a polymeric membrane, such as but not limited to a hollow fiber polymeric membrane or a spiral-wound polymeric membrane.

The sulfate solution 223 may include the portions of the retentate 213 that do not pass through the nanofilter of the second nanofiltration system 220. The sulfate solution 223 may include a greater concentration of sulfates compared to the retentate 213 due to the passage of at least a portion of the water through the nanofilter. The sulfate solution 223 may include at least 95%, at least 98%, or even at least 99% of the sulfate ions from the retentate 213. The sulfate solution 223 may have a concentration of sulfate ions of up to 100 grams per liter, such as from 50 grams per liter to 100 grams per liter. The sulfate solution 223 may be passed from the second filtration system 220 to the OARO system 230. The low-salinity water 206 may be recovered from the permeate side of the nanofilter. The low-salinity water 206 may have a salinity (concentration of salts) of less than 10 grams per liter. The low-salinity water 206 may be passed out of the system 10. The low-salinity water 206 may comprise less than 10 ppmw sulfides, such as hydrogen sulfide and ammonium hydrosulfide, less than 0.05 ppmw of phenolic compounds, and less than 0.05 ppmw of hydrogen cyanide. The low-salinity water 206 may satisfy quality standards for reuse in hydrocarbon production or hydrocarbon processing operations. The low-salinity water 206 may also meet standards for discharge to municipal water treatment systems or other water treatment systems.

Referring to FIG. 2, the system 10 for treating the sour water 101 may include the OARO system 230 downstream of the second nanofiltration system 220. The sulfate solution 223 may be passed from the second nanofiltration system 220 to the OARO system 230 disposed downstream of the second nanofiltration system 220. The OARO system 230 may be positioned upstream of the saturation system 300. OARO system 230 may be operable to increase the concentration of metal sulfates to produce a concentrated sulfate solution 231. The OARO system 230 may include a semi-permeable membrane. In operation of the OARO system 230, the sulfate solution 223 may be passed into contact with the retentate side of the semi-permeable membrane. The retentate side of the semi-permeable membrane may be maintained at a pressure greater than the pressure of the permeate side of the semi-permeable membrane. The pressure difference between the retentate side and permeate side of the semi-permeable membrane may be maintained between 35 bar (3500 kilopascals) and 45 bar (4500 kilopascals). At least a portion of the water in the sulfate solution 223 may pass through the semi-permeable membrane to the retentate side of the membrane, which may decrease the concentration of water on the retentate side to produce the concentrated sulfate solution 231, which may have a greater concentration of sulfates compared to the sulfate solution 223 entering the OARO system 230. The concentrated sulfate solution 231 may have a concentration of metal sulfates of up to 360 grams per liter (360,000 ppmw), such as from 100 grams per liter to 360 grams per liter.

At least a portion of the concentrated sulfate solution 231 may be passed back to the OARO system 230 as a sulfate solution return stream 232. At least 20% of the concentrated sulfate solution 231 may be passed back to the OARO system as the sulfate solution return stream 232. In embodiments, from 20% to 25% of the concentrated sulfate solution 231 may be passed back to the OARO system as the sulfate solution return stream 232. 75% to 80% of the concentrated sulfate solution 231 may be passed on to the saturation system 300. The sulfate solution return stream 232 may be passed into contact with and across the permeate side of the semi-permeable membrane of the OARO system 230. The sulfate solution return stream 232 may combine with the water passing through the semi-permeable membrane to produce a sulfate solution recycle 234, which may have a concentration of sulfates less than the concentration of sulfates in the concentrated sulfate solution 231. The concentration of sulfates in the sulfate solution recycle 234 may also be less than the concentration of sulfates in the sulfate solution 223, the concentration of sulfates in the retentate 213, or both.

The sulfate solution recycle 234 may be passed back to the second nanofiltration system 220. The sulfate solution recycle 234 may be passed back across the retentate side of the second nanofiltration system 220. In embodiments, the sulfate solution recycle 234 may be combined with the retentate 213 upstream of the second nanofiltration system 220 to produce a mixed stream 214, which may then be passed to the second nanofiltration system 220.

Referring again to FIG. 2, at least a portion of the concentrated sulfate solution 231 may be passed from the OARO system 230 to the saturation system 300. The saturation system 300 may have any of the features, characteristics, or operating conditions previously described for the saturation system 300. The saturation system 300 may be downstream of the OARO system 230. The saturation system 300 may be fluidly coupled to the OARO system 230. The portion of the concentrated sulfate solution 231 may be passed from the OARO system 230 to the saturation system 300. In some embodiments, the concentrated sulfate solution 231 may be passed directly from the OARO system 230 to the saturation system 300 without passing through an intervening unit operation operable to change the composition of the concentrated sulfate solution 231. The saturation system 300 may include a vessel, such as the saturating vessel 310. The saturation system 300 may also include the agitation system 311 and heat transfer system 340, which were previously described in this disclosure in relation to FIG. 1.

The concentrated sulfate solution 231 may be introduced to the saturating vessel 310. The saturation system 300 may be operable to remove water from the concentrated sulfate solution 231 to further concentrate the concentrated sulfate solution 231, which may cause saturation of at least a portion of the sulfates from the concentrated sulfate solution 231 to produce the saturation effluent 330. The saturation effluent 330 may include at least the solid metal sulfates in an aqueous suspension. The saturation effluent 330 may also include ammonium sulfate. Operation of the saturation system 300 to remove water and saturate the metal sulfates was previously described in this disclosure in relation to FIG. 1. Saturation of the metal sulfates may result in crystallization of at least a portion of the metal sulfates.

As previously discussed, the saturation system 300 may remove water from the concentrated sulfate solution 231 as water vapor stream 333. The water vapor stream 333 may be passed out of the system 10 to one or more downstream unit operations for further processing, such as but not limited to condensing the water vapor stream 333. The water produced from the water vapor stream 333 may have concentrations of hydrogen sulfide and ammonium hydrosulfide less than 10 ppmw and concentrations of hydrogen cyanide and phenolic compounds of less than 0.05 ppmw. The treated water produced from the water vapor stream 333 may meet standards for reuse of the water in hydrocarbon production or processing operations or for discharge to municipal water treatment systems or other water treatment systems.

As previously discussed, the saturation system 300 may include the filtration system 322. The filtration system 322 may be operable to filter at least a portion of saturated sulfate from the saturation effluent 330 to produce the metal sulfate product 332 and the ammonium sulfate effluent 331. In embodiments, the metal sulfate in the metal sulfate product 332 may include sodium sulfate. The metal sulfate product 332 from 20% to 70% of the metal sulfates from the saturation effluent 330 by weight, such as from 30% to 70%, from 40% to 70%, from 20% to 65%, from 30% to 65%, from 40% to 65%, from 20% to 60%, from 30% to 60%, or from 40% to 60% of the metal sulfates from the saturation effluent 330 by weight. The metal sulfate product 332 may be passed out of the system 10 to one or more downstream unit operations for further processing, such as resaturation, purification, or other processes. The sodium sulfate may be valorized as an intermediate or filler in various industries.

The ammonium sulfate effluent 331 may include at least 90%, at least 95%, at least 98%, or even at least 99% by weight of the ammonium sulfate in the saturation effluent 330. The ammonium sulfate effluent 331 may also include at least 90%, at least 95%, or even at least 98% by weight of the water in the saturation effluent 330. The ammonium sulfate effluent 331 may include at least 30%, at least 35%, or at least 40% by weight of the metal sulfate in the saturation effluent 330. The ammonium sulfate effluent 331 may be passed out of the system 10 to one or a plurality of downstream unit operations for further processing. For example, the ammonium sulfate effluent 331 may be passed to a separation and purification system to separate the ammonium sulfate from the ammonium sulfate effluent 331 and purify the ammonium sulfate. The ammonium sulfate recovered from the process as a solid or as an aqueous solution may be useful as a fertilizer for alkaline soil, as a precursor of chloramine for water disinfection, or as an intermediate in other industrial applications.

Referring back to FIG. 2, in operation of the system 10, the sour water 101 including sulfides and the one or a plurality of carbon-containing compounds may be introduced to the electrolyzer 100. The alkali or alkaline metal hydroxide 102 may be introduced to the electrolyzer 100, in which the alkali or alkaline metal hydroxide 102 is combined with the sour water 101 to form the sour water mixture 111. The electrolyzer 100 may be operable to pass electric current through the sour water mixture 111 to produce the treated sour water 131. The treated sour water 131 may include sulfate ions, ammonium sulfate, and bicarbonate ions. The treated sour water 131 may be passed from the electrolyzer 100 and to the first nanofiltration system 210 downstream of the electrolyzer 100. The first nanofiltration system 210 may operate to separate the bicarbonate ions from the treated sour water 131 to produce the permeate 206 that may include an aqueous solution of bicarbonates and the retentate 213 that may include an aqueous solution of at least metal sulfates and ammonium sulfate. The retentate 213 may be passed from the first nanofiltration system 210 to the second nanofiltration system 220 downstream of the first nanofiltration system 210. The second nanofiltration system 220 may be operable to dewater the retentate 213 or the mixed stream 214 comprising the retentate 213 and the sulfate solution recycle 234 from the OARO system 230 to produce the sulfate solution 223 and low-salinity water 206.

The sulfate solution 223 may be passed from the second nanofiltration system 220 to the OARO system 230 downstream of the second nanofiltration system 220. The OARO system 230 may be operable to concentrate the sulfate solution 223 to produce the concentrated sulfate solution 231. 20% to 25% of the concentrated sulfate solution 231 may be passed back through the permeate side of the OARO system 230 to produce the sulfate solution recycle 234. The other 75% to 80% of the concentrated sulfate solution 231 may be passed out of the OARO system 230 to the saturation system 300 downstream of the OARO system 230. The saturation system 300 may operate to remove water from the concentrated sulfate solution 231, which may further concentrate the concentrated sulfate solution 231 and crystallize at least a portion of the sulfates to produce the saturation effluent 330. The saturation effluent 330 may be a suspension of metal sulfates in an aqueous solution comprising water and ammonium sulfate. Water may be recovered from the saturation system 300 through water vapor stream 333. The saturation effluent 330 may be passed to the filtration unit 322, in which the solid metal sulfates may be separated from the saturation effluent 330 to produce a metal sulfate product 332 and the ammonium sulfate effluent 331.

Referring back to FIG. 1, a process for treating the sour water 101 may include combining sour water 101 with an alkali or alkaline metal hydroxide 102 to produce a sour water mixture 111. The sour water 101 may include at least sulfides. The process for treating the sour water 101 may further include passing an electric current through the sour water mixture 111 at a pH of from 7.1 to 9.8. The passing electric current through the sour water mixture 111 may cause at least a portion of the sulfides to react to produce a treated sour water 131. The treated sour water 131 may comprise sulfate ions and may have a pH of from 7.1 to 9.8. The process for treating the sour water 101 may further include saturating the at least a portion of the sulfates in the aqueous sulfate solution 211 to produce a saturated aqueous sulfate solution 330, and separating at least a portion of saturated sulfates from the saturated aqueous sulfate solution 330.

The process for treating the sour water 101 may include combining the sour water 101 with the alkali or alkaline metal hydroxide 102. The sour water 101 and the alkali or alkaline metal hydroxide 102 may be mixed in the electrolyzer 100. The combining process may be conducted in the electrolyzer 100. The sour water 101 may include sulfides. In some embodiments, the sour water 101 may include the hydrogen sulfide, the ammonium hydrosulfide, or both. The sour water 101 may further include one carbon-containing compound. In some embodiments, the sour water 101 may include phenolic compound, cyanide, or both. In some embodiments, the sour water 101 may include phenol, hydrogen cyanide, or both.

In some embodiments, the flow rates of the sour water 101 introduced to the electrolyzer 100 may be greater than or equal to 15 cubic meters per hour ($m^3$/hr), or even greater than or equal to 20 $m^3$/hr. In some embodiments, the flow rates of the sour water 101 introduced to the electrolyzer 100 may be less than or equal to 30 $m^3$/hr. For example, the flow rates of the sour water 101 may be from 15 $m^3$/hr to 30 $m^3$/hr, from 20 $m^3$/hr to 25 $m^3$/hr, or from 20 $m^3$/hr to 30 $m^3$/hr. The sour water 101 may include from 100 ppmw to 100,000 ppmw of hydrogen sulfide. The sour water 101 may include from 100 ppmw to 100,000 ppmw of ammonium hydrosulfide. The sour water 101 may include the at least one carbon-containing compound, such as but not limited to phenolic compounds, hydrogen cyanide, or both. The sour water 101 may include from 50 ppmw to 500 ppmw phenolic compounds. The sour water 101 may include from 300 ppmw to 500 ppmw hydrogen cyanide. Passing the electric current through the sour water 101 may cause the at least one carbon-containing compound to react to form bicarbonate ions in the treated sour water 131.

Passing the electric current may cause electrolysis of the sour water mixture 111 to convert the treated water. Passing the electric current through the sour water mixture 111 may cause at least a portion of the sulfides in the sour water 101 to convert to the sulfates in the treated sour water 131. For example, the sulfur of the hydrogen sulfide, the ammonium hydrosulfide, or both, may be converted to produce sulfates. In some embodiments, passing the electric current through the sour water mixture 111 may cause at least one carbon-containing in the sour water 101 to react to form bicarbonate ions in the treated sour water 131. For example, phenolic compound, cyanide, or both, may be converted to bicarbonate ions, water, hydrogen, and nitrogen.

The treated sour water 131 may have a pH of from 7.1 to 9.8. The treated sour water 131 may have a pH of from 7.1 to 8.5, 7.5 to 9.8, or 7.5 to 8.5. The treated sour water 131 may have a pH of 8. The passing electric current through the sour water mixture 111 may include passing a current having a current potential (voltage) in volts (V) sufficient to cause electrolysis of the sour water mixture 111, such as from 1 V to 5 V, from 1 V to 4.5 V, from 1 V to 4 V, from 1 V to 3.5 V, from 1 V to 3.0 V, from 1.5 V to 5 V, from 1.5 V to 4.5 V, from 1.5 V to 4 V, from 1.5 V to 3.5 V, from 1.5 V to 3 V, from 2 V to 5 V, from 2 V to 4.5 V, from 2 V to 4 V, from 2 V to 3.5 V, or from 2 V to 3 V. The current passed through the sour water mixture 111 may have a current density that is sufficient to react sulfides, one carbon-containing compound, or both, in the sour water mixture 111, such as a current density of from 0.1 $A/cm^2$ to 1 $A/cm^2$, from 0.1 $A/cm^2$ to 0.95 $A/cm^2$, from 0.1 $A/cm^2$ to 0.9 $A/cm^2$, from 0.15 $A/cm^2$ to 0.95 $A/cm^2$, or from 0.15 $A/cm^2$ to 0.9 $A/cm^2$.

Still referring to FIG. 1, the process for treating the sour water 101 may further include separating bicarbonates from the treated sour water 131 to produce the aqueous sulfate solution. In some embodiments, the separating process may be conducted in a separation system 200. As separating bicarbonates from the treated sour water 131, the separating process may increase the concentration of sulfate ions in the treated sour water 131 to produce the aqueous sulfate solution 211.

Referring to FIG. 2, the process for treating sour water 101 may further include separating the bicarbonates from the treated sour water 131 to produce the retentate 213 and dewatering the retentate 213 to produce the sulfate solution 223. Separating the bicarbonates from the treated sour water 131 may include passing the treated sour water 131 through the first nanofiltration system 210 to produce a permeate 204 and a retentate 213. The permeate 204 may include an aqueous solution of bicarbonate ions. As separating bicarbonates from the treated sour water 131, the separating process may increase the concentration of sulfate ions in the treated sour water 131 to produce the retentate 213. Dewatering the retentate 213 may include passing the retentate 213 through a second nanofiltration system 220 to produce the sulfate solution 223 and a low-salinity water 206.

The process may further include increasing the concentration of the sulfates in the sulfate solution 223 to produce the concentrated sulfate solution 231. Increasing the concentration of sulfates in the sulfate solution 223 may include subjecting at least a portion of the sulfate solution 223 to an osmotically-assisted reverse osmosis system 230 operable to further remove water from the sulfate solution 223 to produce the concentrated sulfate solution 231. The process may include passing at least a portion of the concentrated sulfate solution 231 back through the OARO system 230 on a permeate side of a semi-permeable membrane of the OARO system 230.

Saturating may include subjecting the aqueous sulfate solution 211 (FIG. 1) or the concentrated sulfate solution 231 to vacuum saturation in the saturation system 300. The process may further include recovering water vapor from the saturation system 300. Separating the at least a portion of saturated sulfates from the saturation effluent 330 may include filtering the saturated metal sulfates from the saturation effluent 330 to produce a metal sulfate product 332 and an ammonium sulfate effluent 331. In some embodiments, the flow rates of the aqueous sulfate solution 211 or the concentrated sulfate solution 231 introduced to the saturation system 300, may be greater than or equal to 5 cubic meters per hour ($m^3$/hr), or even greater than or equal to 10 $m^3$/hr. In some embodiments, the flow rates of the aqueous sulfate solution 211 or the concentrated sulfate solution 231 introduced to the saturation system 300, may be less than or equal to 25 $m^3$/hr. For example, the flow rates of the aqueous sulfate solution 211 may be from 5 $m^3$/hr to 30 $m^3$/hr, from 10 $m^3$/hr to 25 $m^3$/hr, from 10 $m^3$/hr to 20 $m^3$/hr, from 10 $m^3$/hr to 30 $m^3$/hr, from 10 $m^3$/hr to 25 $m^3$/hr.

In some embodiments, in the saturating process, the water may be removed from the aqueous sulfate solution 211. In some embodiments, the water may be removed from the aqueous sulfate solution 211 at the volume percentage (vol. %) from 60 vol. % to 80 vol. %, from 60 vol. % to 75 vol. %, from 60 vol. % to 70 vol. %, from 65 vol. % to 80 vol. %, from 65 vol. % to 75 vol. %, or from 70 vol. % to 80 vol. %.

In some embodiments, in the saturating process, at least a portion of the sulfates in the aqueous sulfate solution 211 or the concentrated sulfate solution 231 may be saturated. For example, the at least a portion of the sulfates may be saturated in the saturation system 300. The saturating process may be conducted by heating and cooling the aqueous sulfate solution 211. For example, the aqueous sulfate solution 211 at the inlet of the saturation system 300 may have a temperature of from 30 to 50° C., from 30 to 45° C., from 30 to 40° C., from 35 to 50° C., from 35 to 45° C., from 35 to 40° C., or from 40 to 50° C. In some embodiments, the heating process may be conducted at a temperature of from 50 to 80° C., from 50 to 75° C., from 50 to 70° C., from 50 to 65° C., from 50 to 60° C., from 55 to 80° C., from 55 to 75° C., from 55 to 70° C., from 55 to 65° C., from 60 to 80° C., from 60 to 75° C., from 60 to 70° C., from 65 to 80° C., from 65 to 75° C., of from 70 to 80° C. The aqueous sulfate solution 211 or the concentrated sulfate solution 231 may be saturated under a vacuum of from 88 kilopascals (kPa) to 54 kPa, from 88 kPa to 61 kPa, from 88 kPa to 68 kPa, from 81 kPa to 54 kPa, from 81 kPa to 61 kPa, from 81 kPa to 68 kPa, from 75 kPa to 54 kPa, from 75 kPa to 61 kPa, or from 75 kPa to 68 kPa. The vacuum of the saturation system 300 may depend on the operating temperature of the saturation system 300. For example, at a temperature of 80° C. in the saturation system 300, the vacuum may be 54 kPa (16 inches of mercury). As the temperature decreases, the vacuum may be increased. At the temperature of 50° C. in the saturation system 300, the vacuum may be 88 kPa (26 inches of mercury).

In some embodiments, in the saturating process, the recovered water 333 may be separated from the aqueous sulfate solution 211. In some embodiments, in the saturating process, at least a portion of the saturated sulfates in the saturated aqueous sulfate solution 330 may be separated from the aqueous sulfate solution 211. The saturated aqueous sulfate solution 330 may be filtered. In some embodiments, sodium sulfate 332 may be filtered from the saturated aqueous sulfate solution 330. Sodium sulfate 332 may be filtered in solid phase. Ammonium sulfate 331 may be separated from the remaining saturated aqueous sulfate solution 330. Ammonium sulfate 331 may be separated in aqueous solution phase.

The Sour stripper may be one of the traditional treatments of sour water. It may use water in the form of steam to displace the acido-basic reaction of ammonium hydrosulfide, freeing hydrogen sulfide and ammonia, and to strip the dissolved hydrogen sulfide from the sour water. Hydrogen sulfide may be sent to a downstream treatment process for further processing. The water of the $H_2S$ stripper may then be sent to an ammonia stripper, which uses higher quality water steam to desorb the ammonia from the water. The phenol and cyanide may remain in the water. Usually, the water retaining the phenol and cyanide compounds may be sent to the evaporation ponds without any other treatments. Otherwise it may be sent to a chemical disposal company to further treat the water (usually incineration).

The process for treating sour water of the present disclosure may enable removal of hydrogen sulfide and ammonium hydrosulfide from the sour water, while at the same time removing other hazardous contaminants, such as but not limited to phenolic compounds and cyanide. Metal sulfates, metal bicarbonates, and ammonium sulfates may be recovered from the process and further refined to valorize these materials for various industrial purposes.

Examples

A sour water comprising phenol, hydrogen sulfide, and various salts was treated in a laboratory apparatus comprising a treatment vessel and electrodes comprising tantalum or boron-doped diamond. The pH of the sour water was adjusted into the range of 7.1 to 9.8 using sodium hydroxide. The sour water was subjected to an electric current comprising a voltage potential of 3 V and a current of 0.9 amperes for a period of 5 minutes to produce a treated sour water. The treated sour water was analyzed according to standard test methods to determine the composition of hydrogen sulfide and phenol in the treated sour water. The concentrations of hydrogen sulfide and phenol in the treated sour water were below the detection limits of the analytical methods. The concentrations of hydrogen sulfide and phenol in the treated sour water were compared to the concentrations of hydrogen sulfide and phenol in the sour water prior to treatment. The comparison demonstrated that electrolyzing the sour water was 99.99% efficient at removing hydrogen sulfide and phenol from the sour water.

A first aspect of the present disclosure is directed to a process for treating sour water that may include combining the sour water with an alkali or alkaline metal hydroxide to produce a sour water mixture, the sour water comprising sulfides. The method may further include passing an electric current through the sour water mixture, where passing the electric current through the sour water mixture may cause at least a portion of the sulfides to react to produce a treated sour water comprising sulfates and having a pH of 7.1 to 9.8. The method may further include saturating the at least a portion of the sulfates in an aqueous sulfate solution and separating at least a portion of saturated sulfates from a saturated aqueous sulfate solution.

A second aspect of the present disclosure may include the first aspect, in which the sulfides in the sour water may comprise at least one of hydrogen sulfide, ammonium hydrosulfide, or both.

A third aspect of the present disclosure may include either of the first or second aspects, in which the sour water may comprise from 100 parts per million by weight (ppmw) to 100,000 ppmw hydrogen sulfide.

A fourth aspect of the present disclosure may include any of the first through third aspects, in which the sour water may comprise from 100 ppmw to 100,000 ppmw ammonium hydrosulfide.

A fifth aspect of the present disclosure may include any of the first through fourth aspects, in which the sour water may further comprise at least one carbon-containing compound and where passing the electric current through the sour water may cause the at least one carbon-containing compound to react to form bicarbonate ions.

A sixth aspect of the present disclosure may include the fifth aspect, in which the at least one carbon-containing compound may comprise phenolic compounds, cyanide, or both.

A seventh aspect of the present disclosure may include any of the first through sixth aspects, in which the sour water may comprise from 50 ppmw to 500 ppmw phenolic compounds.

An eighth aspect of the present disclosure may include any of the first through seventh aspects, in which the sour water may comprise 300 ppmw to 500 ppmw of hydrogen cyanide.

A ninth aspect of the present disclosure may include any of the first through eighth aspects, further comprising separating at least a portion of the bicarbonate ions from the treated sour water to produce the aqueous sulfate solution and a bicarbonate effluent.

A tenth aspect of the present disclosure may include any of the first through ninth aspects, further comprising separating the bicarbonate ions from the treated sour water to produce retentate comprising the sulfate ions and a permeate comprising the bicarbonate ions, and dewatering the retentate to produce a sulfate solution.

An eleventh aspect of the present disclosure may include any of the first through tenth aspects, in which separating the bicarbonate ions from the treated sour water may comprise passing the treated sour water through a first nanofiltration system to produce the retentate and the permeate, and dewatering the retentate may comprise passing the retentate through a second nanofiltration system to produce the sulfate solution and low-salinity water.

A twelfth aspect of the present disclosure may include any of the first through eleventh aspects, further comprising increasing a concentration of the sulfate ions in the sulfate solution to produce a concentrated sulfate solution, and saturating the concentrated sulfate solution.

A thirteenth aspect of the present disclosure may include the twelfth aspect, in which increasing the concentration of sulfates in the sulfate solution comprises subjecting at least a portion of the sulfate solution to an osmotically-assisted reverse osmosis system.

A fourteenth aspect of the present disclosure may include any of the first through thirteenth aspects, in which saturating may comprise subjecting the aqueous sulfate solution to vacuum saturation.

A fifteenth aspect of the present disclosure may include any of the first through fourteenth aspects, in which separating the at least a portion of saturated sulfates may comprise filtration.

A sixteenth aspect of the present disclosure is directed to a system for treating sour water that includes an electrolyzer operable to react at least a portion of sulfides and at least one carbon-containing compound to produce a treated sour water comprising sulfate ions and bicarbonate ions and having a pH of 7.1 to 9.8. The system may further include a separation system downstream of the electrolyzer. The separation system may be operable to separate at least a portion of the bicarbonate ions from the treated sour water to produce an aqueous sulfate solution. The system may further include a saturation system operable to saturate at least a portion of metal sulfates from the aqueous sulfate solution A seventeenth aspect of the present disclosure may include the sixteenth aspect, in which the separation system may comprise a first nanofiltration system downstream of the electrolyzer. The first nanofiltration system may be operable to separate the at least a portion of the bicarbonate ions from the treated sour water to produce a retentate and a permeate.

An eighteenth aspect of the present disclosure may include either the sixteenth or seventeenth aspects, in which the separation system may further comprise a second nanofiltration system downstream of the first nanofiltration system. The second nanofiltration system may be operable to dewater the retentate to produce a sulfate solution.

A nineteenth aspect of the present disclosure may include any of the sixteenth through eighteenth aspects, in which the separation system may further comprise an osmotically-assisted reverse osmosis system downstream of the second nanofiltration system. The osmotically-assisted reverse osmosis system may be operable to concentrate the sulfate ions in the sulfate solution to produce a concentrated aqueous sulfate solution.

For the purposes of defining the present technology, the transitional phrase "consisting of" may be introduced in the claims as a closed preamble term limiting the scope of the claims to the recited components or steps and any naturally occurring impurities.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. It should be appreciated that the examples supply compositional ranges for various streams, and that the total amount of isomers of a particular chemical composition can constitute a range.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A process for treating sour water, the process comprising:
    combining the sour water with an alkali or alkaline metal hydroxide to produce a sour water mixture, the sour water comprising sulfides and at least one carbon-containing compound;
    passing an electric current through the sour water mixture, where passing the electric current through the sour water mixture causes at least a portion of the sulfides to react to produce a treated sour water comprising sulfates and having a pH of 7.1 to 9.8, and causes the at least one carbon-containing compound to react to form bicarbonate ions;
    saturating the at least a portion of the sulfates in an aqueous sulfate solution; and
    separating at least a portion of saturated sulfates from a saturated aqueous sulfate solution,
    separating at least a portion of the bicarbonate ions from the treated sour water to produce the aqueous sulfate solution and a bicarbonate effluent, where the bicarbonate effluent includes greater than 60% by weight of the bicarbonate ions from the treated sour water,
    in which the sour water comprises sour water stream produced from hydrocarbon processing operations, produced water from hydrocarbon drilling and production operations, or both.

2. The process of claim 1, in which the sulfides in the sour water comprise at least one of hydrogen sulfide, ammonium hydrosulfide, or both.

3. The process of claim 2, in which the sour water comprises from 100 parts per million by weight (ppmw) to 100,000 ppmw hydrogen sulfide.

4. The process of claim 2, in which the sour water comprises from 100 ppmw to 100,000 ppmw ammonium hydrosulfide.

5. The process of claim 1, in which the at least one carbon-containing compound comprises phenolic compounds, cyanide, or both.

6. The process of claim 1, in which the sour water comprises from 50 ppmw to 500 ppmw phenolic compounds.

7. The process of claim 1, in which the sour water comprises 300 ppmw to 500 ppmw of hydrogen cyanide.

8. The process of claim 1, further comprising:
    separating at least a portion of the bicarbonate ions from the treated sour water to produce a retentate comprising the sulfate ions and a permeate comprising the at least a portion of the bicarbonate ions; and
    dewatering the retentate to produce a sulfate solution.

9. The process of claim 1, in which separating the portion of bicarbonate ions from the treated sour water comprises passing the treated sour water through a first nanofiltration system to produce the retentate and the permeate, and dewatering the retentate comprises passing the retentate through a second nanofiltration system to produce the sulfate solution and low-salinity water comprising less than 10 ppmw sulfides.

10. The process of claim 9, further comprising:
    increasing a concentration of the sulfate ions in the sulfate solution to produce a concentrated sulfate solution; and
    saturating the concentrated sulfate solution.

11. The process of claim 10, in which increasing the concentration of sulfates in the sulfate solution comprises subjecting at least a portion of the sulfate solution to an osmotically-assisted reverse osmosis system.

12. The process of claim 1, in which saturating comprises subjecting the aqueous sulfate solution to vacuum saturation.

13. The process of claim 1, in which separating the at least a portion of saturated sulfates comprises filtration.

14. A system for treating sour water, the system comprising:
    an electrolyzer operable to pass an electric current through the sour water at a pH of from 7.1 to 9.8 to react at least a portion of sulfides and at least one carbon-containing compound to produce a treated sour water comprising sulfate ions and bicarbonate ions;
    a separation system downstream of the electrolyzer, the separation system operable to separate at least a portion of the bicarbonate ions from the treated sour water to produce an aqueous sulfate solution and a bicarbonate effluent, where the bicarbonate effluent includes greater than 60% by weight of the bicarbonate ions from the treated sour water; and
    a saturation system operable to saturate at least a portion of metal sulfates from the aqueous sulfate solution,
    in which the sour water comprises sour water stream produced from hydrocarbon processing operations, produced water from hydrocarbon drilling and production operations, or both.

15. The system of claim 14, in which the separation system comprises:
    a first nanofiltration system downstream of the electrolyzer, the first nanofiltration system operable to separate the at least a portion of the bicarbonate ions from the treated sour water to produce a retentate and a permeate.

16. The system of claim 15, in which the separation system further comprises:
    a second nanofiltration system downstream of the first nanofiltration system, the second nanofiltration system operable to dewater the retentate to produce a sulfate solution.

17. The system of claim 16, in which the separation system further comprises:
    an osmotically-assisted reverse osmosis system downstream of the second nanofiltration system, the osmotically-assisted reverse osmosis system operable to concentrate the sulfate ions in the sulfate solution to produce a concentrated aqueous sulfate solution.

18. The process of claim 1, in which the process does not require an oxidant to remove the sulfides from the sour water.

19. The process of claim 1, in which the sulfate solution has a concentration of sulfate ions of up to 100 grams per liter.

* * * * *